United States Patent [19]

Deeg et al.

[11] 4,135,792

[45] Jan. 23, 1979

[54] ALL PLASTIC SPECTACLES

[75] Inventors: Emil W. Deeg, Woodstock, Conn.; Edward A. Travnicek, Southbridge, Mass.

[73] Assignee: American Optical Corporation, Southbridge, Mass.

[21] Appl. No.: 823,563

[22] Filed: Aug. 11, 1977

Related U.S. Application Data

[63] Continuation of Ser. No. 659,809, Feb. 20, 1976, abandoned.

[51] Int. Cl.$^2$ .......................... G02C 1/00; G02C 1/08; G02C 5/00
[52] U.S. Cl. ......................................... 351/41; 351/83; 351/92; 351/154
[58] Field of Search ........................ 351/41, 83, 85, 90, 351/92, 154, 174, 178

[56] References Cited

U.S. PATENT DOCUMENTS

| | | | |
|---|---|---|---|
| 3,243,249 | 3/1966 | Lissac | 351/154 |
| 3,549,248 | 12/1970 | Schuler | 351/83 X |
| 3,702,218 | 11/1972 | Manhire | 351/83 X |
| 3,708,567 | 1/1973 | Hampel | 351/178 X |

Primary Examiner—John K. Corbin
Assistant Examiner—Rodney B. Bovernick
Attorney, Agent, or Firm—Jeremiah J. Duggan; H. R. Berkenstock, Jr.

[57] ABSTRACT

Warpage-free spectacles comprised of plastic lenses and plastic frames wherein the frames are constructed of materials having the same or lower tensile elastic modulus and/or the same coefficient of thermal expansion as the lens material.

5 Claims, 3 Drawing Figures

ALL PLASTIC SPECTACLES

This is a continuation of application Ser. No. 659,809 filed Feb. 20, 1976 now abandoned.

BACKGROUND OF THE INVENTION

1. Field of the Invention

This invention relates to improvements in spectacles especially of the type having plastic frame fronts and plastic lenses.

2. Discussion of the Prior Art

At present, plastic ophthalmic lenses, e.g. those made of allyldiglycolcarbonate, polymethyl-methacrylate or polycarbonates, are mounted in metal or plastic spectacle frames according to techniques developed more specifically for the mounting of lenses made of silicate glasses.

In the case of metal frames, rims holding the lenses are tightened by one or more screws. In plastic frames, a cool lens is inserted in a heated, expanded frame and held thereinplace by forces resulting from shrinkage of the frame rims after the frame is cooled.

These mounting techniques apply relatively high circumferential clamping pressures to the lenses which can be withstood by glass lenses but not so with plastic lenses. Plastic lenses which are relatively flexible can and commonly become distorted by conventional lens-mounting techniques with the result of unwanted and uncontrolled changes in their optical performance after they have been mounted.

Attempts to reduce the distortion of plastic lenses by reducing clamping pressures below those normally used are thwarted by temperature changes in wearing environments which can further loosen the lenses to the extent that they can rattle in the frame and may even fall out.

The aforesaid and related problems of mounting plastic ophthalmic lenses are overcome according to the present invention by abandoning conventional mechanical clamping of plastic lenses in spectacle frames. Strong and permanent lens support under all normal wearing conditions and temperatures is accomplished by a unique selection of compatible lens and frame materials wherein frames having the same or lower tensile elastic modulus and/or the same coefficient of thermal expansion as the lens materials are used.

SUMMARY OF THE INVENTION

Spectacles produced according to this invention have the advantage that they are free of lens warpage immediately after assembly and during use. This is accomplished by providing spectacle frames of materials which have the same or lower tensile elastic modulus and/or the same coefficient of thermal expansion as the material of plastic lenses intended to be supported therein. Lens supporting frame fronts and lenses may both be constructed of the same material or the lenses may be formed of a material having a greater tensile elastic modulus than the frame front material and/or the frame front and lens materials may have the same coefficients of linear thermal expansion.

A departure from the conventional internally grooved and externally beveled lens rim and lens edge configurations is also made possible according to this invention. Lens mounting without beveling is contemplated. This obviates tedious, time-consuming and expensive lens rim grooving and lens beveling operations while easing lens-frame assembly operations and yielding superior product quality at lower cost.

Other objects and advantages of the present invention will become apparent from the following description when taken in conjunction with the accompanying drawings.

IN THE DRAWINGS

DESCRIPTION OF THE PREFERRED EMBODIMENTS

Figure 1:
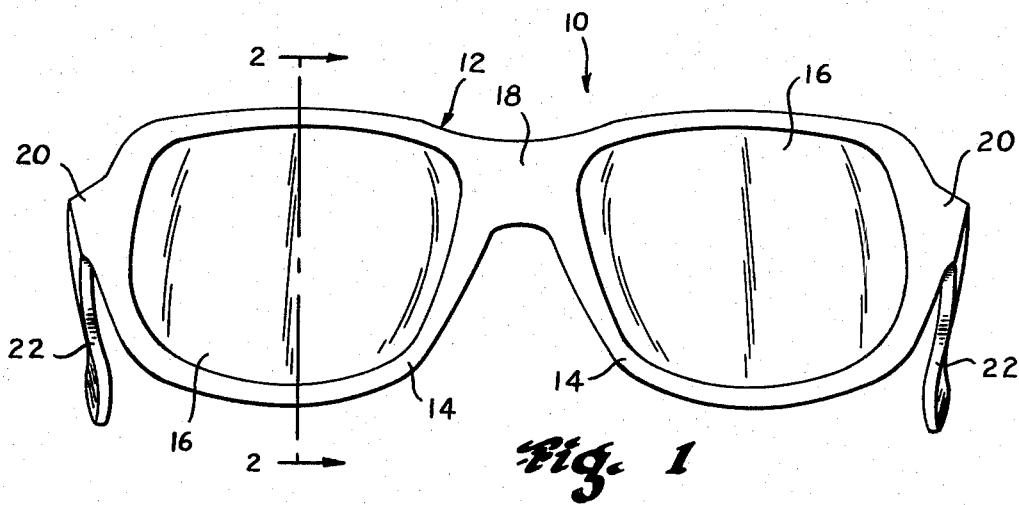
FIG. 1 is a front elevational view of a spectacle frame constructed according to the invention.

The drawings illustrate a pair of spectacles 10 (FIG. 1) comprising a frame front 12 having a pair of lens rims 14 which support lenses 16, a bridge portion 18, endpieces 20 and temples 22. The particular shape of lenses 16, rims 14 and other components of spectacles 10 are not intended to be restrictive to the present invention, it being understood that the invention is applicable to all shapes, styles and/or designs of plastic spectacle frames which may be used to support plastic ophthalmic lenses.

According to principles of this invention, lens rims 14 of spectacle frame front 12 are formed of a plastic material having the same coefficient of linear thermal expansion and/or the same or a lower tensile elastic modulus as the material of lenses 16 to be mounted in rims 14. By such means, i.e. the use of mechanically compatible materials, expansion and/or contraction of lenses 16 after they have been mounted in frame front 12 is prevented from producing unwanted and uncontrolled changes in their optical performance. The expansion and/or contraction of frame front 12 being similar to that of lenses 16 or the material of frame front 12 being of a lower elastic modulus than lenses 16 will allow linear expansion and contraction of lenses 16 without inducing forces therein of sufficient magnitude to effect distortion of their optically finished prescriptive surfaces.

It is contemplated that spectacle frame front 12 and lenses 16 may be produced by any technique desired. For example, spectacle frame front 12 may be blanked, cut and/or otherwise mechanically shaped from extruded or precast sheets of a desirable plastic material or, altenatively, molded or cast directly to the desired finished configuration. Similarly, lenses 16 may be cut, ground and/or polished from precast lens material or cast directly to desired finished shapes. While the particular techniques used for constructing either frame 12 or lenses 16 does not per se form a particular part of the present invention, those interested in details of a suitable technique for forming frame front 12 may refer to U.S. Pat. Nos. 2,589,419 and 3,850,902. For forming lenses 16, reference may be made to U.S. Pat. No. 3,902,693.

Figure 2:
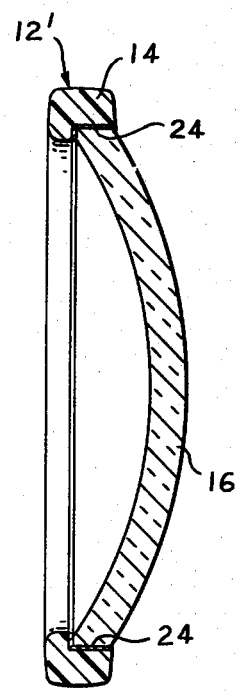
FIG. 2 is a cross-sectional view taken generally along line 2—2 of FIG. 1.
Figure 3:
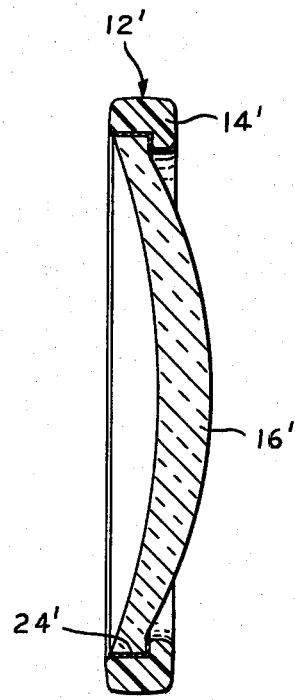
FIG. 3 is a view similar to FIG. 2 but illustrating a modification of the invention.

While the present invention is applicable to the more conventional technique of mounting lenses in spectacle frame fronts by bevel edging, a less complicated lens supporting system may be employed. This is illustrated in FIG. 2 wherein the usual lens rim groove is replaced by a flat lens-receiving seat 24. In this instance, seat 24 extends into the front of lens rim 14. Lens 16 in each case is provided with a matching flat edge and cemented in place with an epoxy or other suitable plastic cement. Problems relating to conventional differential expansion of spectacle frame fronts and lenses having been obviated, a secure and permanent connection between lens and frame can thus be accomplished. A modification of the lens-supporting system of FIG. 2 is shown in FIG. 3. Therein lens 16' in rim 14' is supported in channel 24' which extends into the back of frame front 12'. This conceals the cemented connection when the frame is viewed from the front.

Referring more particularly to matters of actually providing plastic spectacle frame fronts and plastic lenses of mechanically compatible materials according to the crux of the present invention, desirable material combinations are set forth in Table I hereinbelow. In Table I, each occurrence of an X designates a combination of lens and frame front materials which has been determined to accomplish the objective of the invention; reading directly above and to the left of each X will indicate respective lens and frame front materials designated for that particular combination. For example: the first (to the left) of the two uppermost X's in Table I designates a combination of Polystyrene (lens material) and acetal homopolymer (frame material). The last X in the lower right hand corner of Table I designates allyldiglycolcarbonate (for lens material) and cellulose acetate (for frame material).

TABLE I

| | Lens Materials | |
|---|---|---|
| | Cast Acrylic (PMMA) | Poly Carbonates (unfilled) |
| Frame Materials | $E = 3.5 - 4.5$ $\alpha = 5.0 - 9.0$ $n = 1.48 - 1.50$ | $E = 3.0 - 3.5$ $\alpha = 6.6$ $n = 1.586$ |
| Acetal Homopolymer $E = 5.2$ $\alpha = 8.1$ | | |
| ABS - clear (acrylonitrile-butadiene-styrene) $E = 2.9$ $\alpha = 8.3$ | X | |
| ABS - high impact (acrylonitrile-butadiene-styrene) $E = 2.4 - 3.4$ $\alpha = 9.0 - 13.0$ | X | |
| ABS - medium impact (acrylonitrile-butadiene-styrene) $E = 3.0 - 4.5$ $\alpha = 8.0 - 10.0$ | X | |
| ABS - high heat resistant (acrylonitrile-butadiene-styrene) $E = 2.9 - 4.2$ $\alpha = 6.0 - 9.3$ | X | X |
| Epoxy - cast unfilled (diglycidal ether of bisphenol A) $E = 3.5$ $\alpha = 4.5 - 6.5$ | X | X |
| Epoxy - flexibilized (diglycidal ether of bisphenol A) $E = 0.1 - 3.5$ $\alpha = 2.0 - 10.0$ | X | X |
| Polycarbonate (unfilled) $E = 3.0 - 3.5$ $\alpha = 6.6$ | | X |
| Polyvinylchloride (rigid) $E = 3.5 - 6.0$ $\alpha = 5.0 - 10.0$ | X | X |
| Allyldiglycolcarbonate (clear) $E = 3.0$ $\alpha = 8.1 - 14.3$ | X | X |
| Cellulose acetate $E = 0.65 - 4.0$ $\alpha = 8.0 - 18.0$ | X | X |
| Acetal Homopolymer $E = 5.2$ $\alpha = 8.1$ | X | X |

TABLE I-continued

| | Lens Materials | |
|---|---|---|
| | Polystyrene (unfilled) | Allyldiglycol-carbonate |
| Frame Materials | $E = 4.0 - 6.0$ $\alpha = 6.0 - 8.0$ $n = 1.59 - 1.60$ | $E = 3.0$ $\alpha = 8.1 - 14.3$ $n = 1.50$ |
| ABS - clear (acrylonitrile-butadiene-styrene) $E = 2.9$ $\alpha = 8.3$ | | X |
| ABS - high impact (acrylonitrile-butadiene-styrene) $E = 2.4 - 3.4$ $\alpha = 9.0 - 13.0$ | | X |
| ABS - medium impact (acrylonitrile-butadiene-styrene) $E = 3.0 - 4.5$ $\alpha = 8.0 - 10.0$ | X | X |
| ABS - high heat resistant (acrylonitrile-butadiene-styrene) $E = 2.9 - 4.2$ $\alpha = 6.0 - 9.3$ | X | X |
| Epoxy - cast unfilled (diglycidal ether of bisphenol A) $E = 3.5$ $\alpha = 4.5 - 6.5$ | | |
| Epoxy - flexibilized (diglycidal ether of bisphenol A) $E = 0.1 - 3.5$ $\alpha = 2.0 - 10.0$ | X | X |
| Polycarbonate (unfilled) $E = 3.0 - 3.5$ $\alpha = 6.6$ | X | |
| Polyvinylchloride (rigid) $E = 3.5 - 6.0$ $\alpha = 5.0 - 10.0$ | X | X |
| Allyldiglycolcarbonate (clear) $E = 3.0$ $\alpha = 8.1 - 14.3$ | | X |
| Cellulose acetate $E = 0.65 - 4.0$ $\alpha = 8.0 - 18.0$ | X | X |

$E$ = tensile elastic modulus in psi $.10^5$.
$\alpha$ = coefficient of linear thermal expansion in (degr. C)$^{-1}$ . $10^{-5}$
n = refractive index For greater details of properties availability and manner of procuring lens and frame materials set forth in Table I, reference may be made to Modern Plastics Encyclopedia, 1974–1975 published by McGraw-Hill.

Those skilled in the art will readily appreciate that there are various other modifications and adaptations of the forms of the invention here shown which may be made to suit particular requirements. Accordingly, the foregoing illustrations of the invention are not to be interpreted as restrictive thereof beyond that necessitated by the following claims.

We claim:

1. In the art of manufacturing spectacles with frame fronts having plastic lens supporting rims and plastic lenses supported therein, the invention comprising:
a series of plastic spectacles with rim and lens material combinations having compatible tensile elastic moduli and coefficients of linear thermal expansion for avoidance of spectacles lens loosening and warpage due to tightening in supporting rims under changes in environmental temperatures, said series of spectacles comprising the particular combinations of frame and lens materials charted by the symbols X in the following Table I

TABLE I

| Frame Materials | Cast Acrylic (PMMA)<br>E = 3.5–4.5<br>α = 5.0–9.0<br>n = 1.48–1.50 | Poly Carbonates (unfilled)<br>E = 3.0–3.5<br>α = 6.6<br>n = 1.586 |
|---|---|---|
| Acetal Homopolymer<br>E = 5.2<br>α = 8.1 | | |
| ABS - clear (acrylonitrile-butadiene-styrene)<br>E = 2.9<br>α = 8.3 | X | |
| ABS - high impact (acrylonitrile-butadiene-styrene)<br>E = 2.4–3.4<br>α = 9.0–13.0 | X | |
| ABS - medium impact (acrylonitrile-butadiene-styrene)<br>E = 3.0–4.5<br>α = 8.0–10.0 | X | |
| ABS - high heat resistant (acrylonitrile-butadiene-styrene)<br>E = 2.9–4.2<br>α = 6.0–9.3 | X | X |
| Epoxy - cast unfilled (diglycidal ether of bisphenol A)<br>E = 3.5<br>α = 4.5–6.5 | X | X |
| Epoxy - flexibilized (diglycidal ether of bisphenol A)<br>E = 0.1–3.5<br>α = 2.0–10.0 | X | X |
| Polycarbonate (unfilled)<br>E = 3.0–3.5<br>α = 6.6 | X | X |
| Polyvinylchloride (rigid)<br>E = 3.5–6.0<br>α = 5.0–10.0 | X | X |
| Allyldiglycolcarbonate (clear)<br>E = 3.0<br>α = 8.1–14.3 | X | X |
| Cellulose acetate<br>E = 0.65–4.0<br>α = 8.0–18.0 | X | X |
| Acetal Homopolymer<br>E = 5.2<br>α = 8.1 | X | X |
| ABS - clear (acrylonitrile-butadiene-styrene)<br>E = 2.9<br>α = 8.3 | | X |

TABLE I-continued

| Frame Materials | Polystyrene (unfilled)<br>E = 4.0–6.0<br>α = 6.0–8.0<br>n = 1.59–1.60 | Allyldiglycol-carbonate<br>E = 3.0<br>α = 8.1–14.3<br>n = 1.50 |
|---|---|---|
| ABS - high impact (acrylonitrile-butadiene-styrene)<br>E = 2.4–3.4<br>α = 9.0–13.0 | | X |
| ABS - medium impact (acrylonitrile-butadiene-styrene)<br>E = 3.0–4.5<br>α = 8.0–10.0 | X | X |
| ABS - high heat resistant (acrylonitrile-butadiene-styrene)<br>E = 2.9–4.2<br>α = 6.0–9.3 | X | X |
| Epoxy - cast unfilled (diglycidal ether of bisphenol A)<br>E = 3.5<br>α = 4.5–6.5 | | |
| Epoxy - flexibilized (diglycidal ether of bisphenol A)<br>E = 0.1–3.5<br>α = 2.0–10.0 | X | X |
| Polycarbonate (unfilled)<br>E = 3.0–3.5<br>α = 6.6 | X | |
| Polyvinylchloride (rigid)<br>E = 3.5–6.0<br>α = 5.0–10.0 | X | X |
| Allyldiglycolcarbonate (clear)<br>E = 3.0<br>α = 8.1–14.3 | | X |
| Cellulose acetate<br>E = 0.65–4.0<br>α = 8.0–18.0 | X | X |

E = tensile elastic modulus in psi $\cdot 10^5$.
α = coefficient of linear thermal expansion in (degr. C)$^{-1} \cdot 10^{-5}$
n = refractive index 2. Spectacles according to claim 1 wherein said lens rims and lenses have the same tensile elastic modulus.

3. Spectacles according to claim 1 wherein said rims have a lower tensile elastic modulus than said lenses.

4. Spectacles according to claim 1 wherein said lens rims and lenses have approximately the same coefficient of thermal expansion.

5. Spectacles according to claim 1 wherein said lenses are cemented to said rims.

* * * * *

UNITED STATES PATENT AND TRADEMARK OFFICE
CERTIFICATE OF CORRECTION

PATENT NO. : 4,135,792
DATED : January 23, 1979
INVENTOR(S) : Deeg et al.

It is certified that error appears in the above-identified patent and that said Letters Patent are hereby corrected as shown below:

In Column 3 delete lines 65, 66 and 67.

In Column 4 between lines 7 and 8 insert:

Acetal Homopolymer
    E = 5.2
    a = 8.1                        X                   X In Column 5 delete lines 42 through 47.

In Column 6 between lines 7 and 8 insert:

Acetal Homopolymer
    E = 5.2
    a = 8.1                        X                   X
    ABS - clear
    (acrylonitrile-butadiene-
    styrene)
    E = 2.9
    a = 8.3                                         X Signed and Sealed this Fifteenth Day of May 1979

[SEAL]

Attest:

RUTH C. MASON
Attesting Officer

DONALD W. BANNER
Commissioner of Patents and Trademarks